US009047732B2

(12) United States Patent
O'Brien

(10) Patent No.: US 9,047,732 B2
(45) Date of Patent: *Jun. 2, 2015

(54) METHOD, APPARATUS, AND COMPUTER-READABLE MEDIA FOR ENABLING REAL-TIME COMPETITION HAVING AN ENTERTAINING EXPERIENCE BASED ON A LIVE EVENT

(71) Applicant: ICONIC WORLDWIDE GAMING LIMITED, Manchester (GB)

(72) Inventor: Patrick Damien O'Brien, Cheshire (GB)

(73) Assignee: Iconic Worldwide Gaming Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,984

(22) Filed: Apr. 21, 2014

(65) Prior Publication Data

US 2014/0287819 A1 Sep. 25, 2014

Related U.S. Application Data

(63) Continuation of application No. 13/894,037, filed on May 14, 2013, now Pat. No. 8,727,868.

(60) Provisional application No. 61/789,843, filed on Mar. 15, 2013.

(51) Int. Cl.
| G06F 17/00 | (2006.01) |
| G06F 19/00 | (2011.01) |
| G07F 17/32 | (2006.01) |
| G06Q 50/34 | (2012.01) |

(52) U.S. Cl.
CPC .......... *G07F 17/3244* (2013.01); *G06Q 50/34* (2013.01)

(58) Field of Classification Search
CPC ..... G06Q 50/34; G07F 17/3288; G07F 17/32; G07F 17/3211; G07F 17/3213; G07F 17/3225; G07F 17/323; G07F 17/3276
USPC ........ 463/1, 9, 16, 25, 29–33, 40–43; 705/35, 705/36 R, 37
See application file for complete search history.

(56) References Cited

U.S. PATENT DOCUMENTS

| 5,608,620 | A | * | 3/1997 | Lundgren | ....................... 705/1.1 |
| 5,749,785 | A | * | 5/1998 | Rossides | .......................... 463/25 |
| 6,236,900 | B1 | * | 5/2001 | Geiger | ............................ 700/91 |

(Continued)

*Primary Examiner* — Milap Shah
(74) *Attorney, Agent, or Firm* — Stephen M. Hertzler; Reed Smith LLP

(57) ABSTRACT

The disclosed embodiment relates to methods, apparatus, and computer-readable media for enabling real-time competition. An exemplary computer-implemented method executed by one or more computing devices for enabling real-time competition between users according to the disclosed embodiment includes, for example, receiving information from a first user computing device associated with a first user corresponding to the first user's competitive position regarding a real-time event, transmitting information to a second user computing device associated with a second user identifying the real-time event, receiving information from the second user computing device corresponding to the second user's competitive position regarding the real-time event, and transmitting information to the first user computing device and the second user computing device regarding an outcome of the real-time event relative to the first user's competitive position and the second user's competitive position.

24 Claims, 10 Drawing Sheets

(56) References Cited

U.S. PATENT DOCUMENTS

| | | | | |
|---|---|---|---|---|
| 6,325,721 | B1 * | 12/2001 | Miyamoto et al. | 463/40 |
| 6,473,084 | B1 * | 10/2002 | Phillips et al. | 345/440 |
| 6,659,861 | B1 * | 12/2003 | Faris et al. | 463/1 |
| 6,709,330 | B1 * | 3/2004 | Klein et al. | 463/9 |
| 7,040,982 | B1 * | 5/2006 | Jarvis et al. | 463/9 |
| 7,306,514 | B2 * | 12/2007 | Amaitis et al. | 463/6 |
| 7,566,268 | B2 * | 7/2009 | Asher et al. | 463/17 |
| 7,566,270 | B2 * | 7/2009 | Amaitis et al. | 463/22 |
| 7,637,807 | B2 * | 12/2009 | Asher et al. | 463/19 |
| 7,693,778 | B2 * | 4/2010 | Nafeh | 705/37 |
| 7,708,636 | B2 * | 5/2010 | Asher et al. | 463/22 |
| 7,789,754 | B2 * | 9/2010 | Asher et al. | 463/22 |
| 8,086,510 | B2 * | 12/2011 | Amaitis et al. | 705/35 |
| 8,118,654 | B1 * | 2/2012 | Nicolas et al. | 463/9 |
| 8,275,694 | B2 * | 9/2012 | Tzroya | 705/37 |
| 8,568,222 | B2 * | 10/2013 | Gagner et al. | 463/25 |
| 8,727,868 | B1 * | 5/2014 | O'Brien | 463/42 |
| 8,727,869 | B1 * | 5/2014 | O'Brien | 463/25 |
| 2001/0032169 | A1 * | 10/2001 | Sireau | 705/37 |
| 2002/0013762 | A1 * | 1/2002 | Yoshimi et al. | 705/37 |
| 2002/0026321 | A1 * | 2/2002 | Faris et al. | 705/1 |
| 2002/0073021 | A1 * | 6/2002 | Ginsberg et al. | 705/38 |
| 2002/0153656 | A1 * | 10/2002 | Maksymec et al. | 273/138.1 |
| 2002/0155884 | A1 * | 10/2002 | Updike | 463/25 |
| 2002/0155885 | A1 * | 10/2002 | Shvili | 463/25 |
| 2003/0078087 | A1 * | 4/2003 | Kojima et al. | 463/6 |
| 2003/0157976 | A1 * | 8/2003 | Simon et al. | 463/1 |
| 2003/0204566 | A1 * | 10/2003 | Dhupelia et al. | 709/205 |
| 2004/0204232 | A1 * | 10/2004 | Asher et al. | 463/25 |
| 2005/0003878 | A1 * | 1/2005 | Updike | 463/16 |
| 2005/0027643 | A1 * | 2/2005 | Amaitis et al. | 705/37 |
| 2005/0116410 | A1 * | 6/2005 | Vlazny et al. | 273/139 |
| 2005/0197938 | A1 * | 9/2005 | Davie et al. | 705/35 |
| 2005/0197939 | A1 * | 9/2005 | Davie et al. | 705/35 |
| 2005/0197948 | A1 * | 9/2005 | Davie et al. | 705/37 |
| 2005/0208996 | A1 * | 9/2005 | Friedman | 463/25 |
| 2005/0245305 | A1 * | 11/2005 | Asher et al. | 463/16 |
| 2005/0245306 | A1 * | 11/2005 | Asher et al. | 463/16 |
| 2005/0245308 | A1 * | 11/2005 | Amaitis et al. | 463/20 |
| 2005/0245310 | A1 * | 11/2005 | Amaitis et al. | 463/20 |
| 2006/0014583 | A1 * | 1/2006 | Harris et al. | 463/25 |
| 2006/0105839 | A1 * | 5/2006 | Graeve et al. | 463/42 |
| 2006/0105840 | A1 * | 5/2006 | Graeve | 463/42 |
| 2006/0199631 | A1 * | 9/2006 | McGill et al. | 463/16 |
| 2006/0247056 | A1 * | 11/2006 | Luckerson | 463/42 |
| 2007/0265092 | A1 * | 11/2007 | Betteridge | 463/42 |
| 2009/0061995 | A1 * | 3/2009 | Assia et al. | 463/25 |
| 2009/0062016 | A1 * | 3/2009 | Assia et al. | 463/42 |
| 2010/0035673 | A1 * | 2/2010 | Kertcher et al. | 463/9 |
| 2010/0041453 | A1 * | 2/2010 | Grimm, Jr. | 463/6 |
| 2010/0144425 | A1 * | 6/2010 | Dannenberg | 463/25 |
| 2011/0065494 | A1 * | 3/2011 | Kennedy et al. | 463/25 |
| 2011/0098096 | A1 * | 4/2011 | Odom et al. | 463/17 |
| 2012/0178535 | A1 * | 7/2012 | Short | 463/42 |
| 2012/0283000 | A1 * | 11/2012 | Volkov | 463/25 |
| 2014/0162786 | A1 * | 6/2014 | Hartleip | 463/42 |

* cited by examiner

METHOD, APPARATUS, AND COMPUTER-READABLE MEDIA FOR ENABLING REAL-TIME COMPETITION HAVING AN ENTERTAINING EXPERIENCE BASED ON A LIVE EVENT

RELATED APPLICATION DATA

This application is a continuation of U.S. patent application Ser. No. 13/894,037, filed May 14, 2013, now U.S. Pat. No. 8,727,868, which claims priority to Provisional Application No. 61/789,843, filed Mar. 15, 2013, the entire contents of all of which are included herein by reference.

FIELD OF THE INVENTION

The disclosed embodiment relates to methods, apparatus, and computer-readable media for enabling real-time competition.

SUMMARY

The disclosed embodiment relates to methods, apparatus, and computer-readable media for enabling real-time competition. An exemplary computer-implemented method executed by one or more computing devices for enabling real-time competition between users according to the disclosed embodiment includes, for example, receiving information from a first user computing device associated with a first user corresponding to the first user's competitive position regarding a real-time event, transmitting information to a second user computing device associated with a second user identifying the real-time event, receiving information from the second user computing device corresponding to the second user's competitive position regarding the real-time event, and transmitting information to the first user computing device and the second user computing device regarding an outcome of the real-time event relative to the first user's competitive position and the second user's competitive position. Information may be received from a live feed regarding the real-time event. In addition, the real-time competition may have a set duration, and the information regarding the outcome of the real-time event relative to the first user's competitive position and the second user's competitive position may be transmitted in real-time during the duration of the real-time competition. Furthermore, the information from the first user computing device corresponding to the first user's competitive position and the information from the second user computing device corresponding to the second user's competitive position may include a selection of one or more criteria associated with the real-time event. Also, the information from the first user computing device corresponding to the first user's competitive position and the information from the second user computing device corresponding to the second user's competitive position may further include information corresponding to a wager based on one or more criteria associated with the real-time event. The real-time event may also correspond to the performance of one or more commodities.

Another exemplary computer-implemented method executed by one or more computing devices for enabling real-time competition between users according to the disclosed embodiment includes, for example, transmitting information corresponding to a first user's competitive position regarding a real-time event, receiving information corresponding to a second user's competitive position regarding the real-time event, receiving information regarding an outcome of the real-time event relative to the first user's competitive position and the second user's competitive position, and displaying an entertaining experience to the first user based on the outcome of the real-time event relative to the first user's competitive position and the second user's competitive position. The information regarding the outcome of the real-time event may be received from a live feed. In addition, the real-time competition may have a set duration, and the information regarding the outcome of the real-time event relative to the first user's competitive position and the second user's competitive position may be received in real-time during the duration of the real-time competition. Also, the information corresponding to the first user's competitive position and the information corresponding to the second user's competitive position may include a selection of one or more criteria associated with the real-time event. Furthermore, the information corresponding to the first user's competitive position and the information corresponding to the second user's competitive position may further include information corresponding to a wager based on one or more criteria associated with the real-time event. The real-time event may also corresponds to the performance of one or more commodities. Moreover, the entertaining experience may be displayed as a game indicating the outcome of the real-time event relative to the first user's competitive position and the second user's competitive position. The subject matter of the entertaining experience may or may not be related to the subject matter of the real-time event.

The disclosed embodiment also relates to apparatus for enabling real-time competition between users. An exemplary apparatus comprises one or more processors, and one or more memories operatively coupled to at least one of the one or more processors and having instructions stored thereon that, when executed by at least one of the one or more processors, cause at least one of the one or more processors to carry out one or more of the methods according to the disclosed embodiment.

The disclosed embodiment further relates to at least one non-transitory computer-readable medium storing computer-readable instructions that, when executed by one or more computing devices, cause at least one of the one or more computing devices to carry out one or more of the methods according to the disclosed embodiment.

BRIEF DESCRIPTION OF THE DRAWINGS

The disclosed embodiment relates to a method and apparatus for enabling real-time competition.

DETAILED DESCRIPTION

The disclosed embodiment relates to methods, apparatus, and computer-readable media for enabling real-time competition between one or more users via computing devices.

According to the disclosed embodiment, one or more users may compete either against other users or against a non-user entity in a real-time event. In an exemplary scenario, users can challenge each other to competitions based on real-time events using the methods of the disclosed embodiment (i.e. peer-to-peer competition). Each user can then experience the competition in real-time through a user interface on a computing device associated with that user. For example, the competition may be presented to each user as a game (i.e. soccer, football, racing, and the like), with the gameplay experience and the outcome of the game being determined by the outcome of the real-time event. The subject matter of the real-time event need not be associated with the subject matter of the entertainment experience presented to one or more of the users.

As disclosed herein, the competitions of the disclosed embodiment typically utilize selections by each user of a competitive position regarding a real-time event. The competitive positions of each user may also include selections of any number of criteria associated with their respective competitive positions or the real-time event. The competitive positions of each user are preferably compared with information regarding the real-time event, for example, from a live feed or other data source. During the course of the competition, which may have any suitable duration, the results of the comparisons between the live feed and the competitive positions of the different users can be displayed in real-time to provide the users with their current standings relative to each other user, and can also provide the final outcome of the competition at the conclusion of the competition. The duration of each competition may vary greatly, with exemplary durations being based on set periods of time, being tied to the conclusion of the real-time event, or any other duration.

Figure 1:
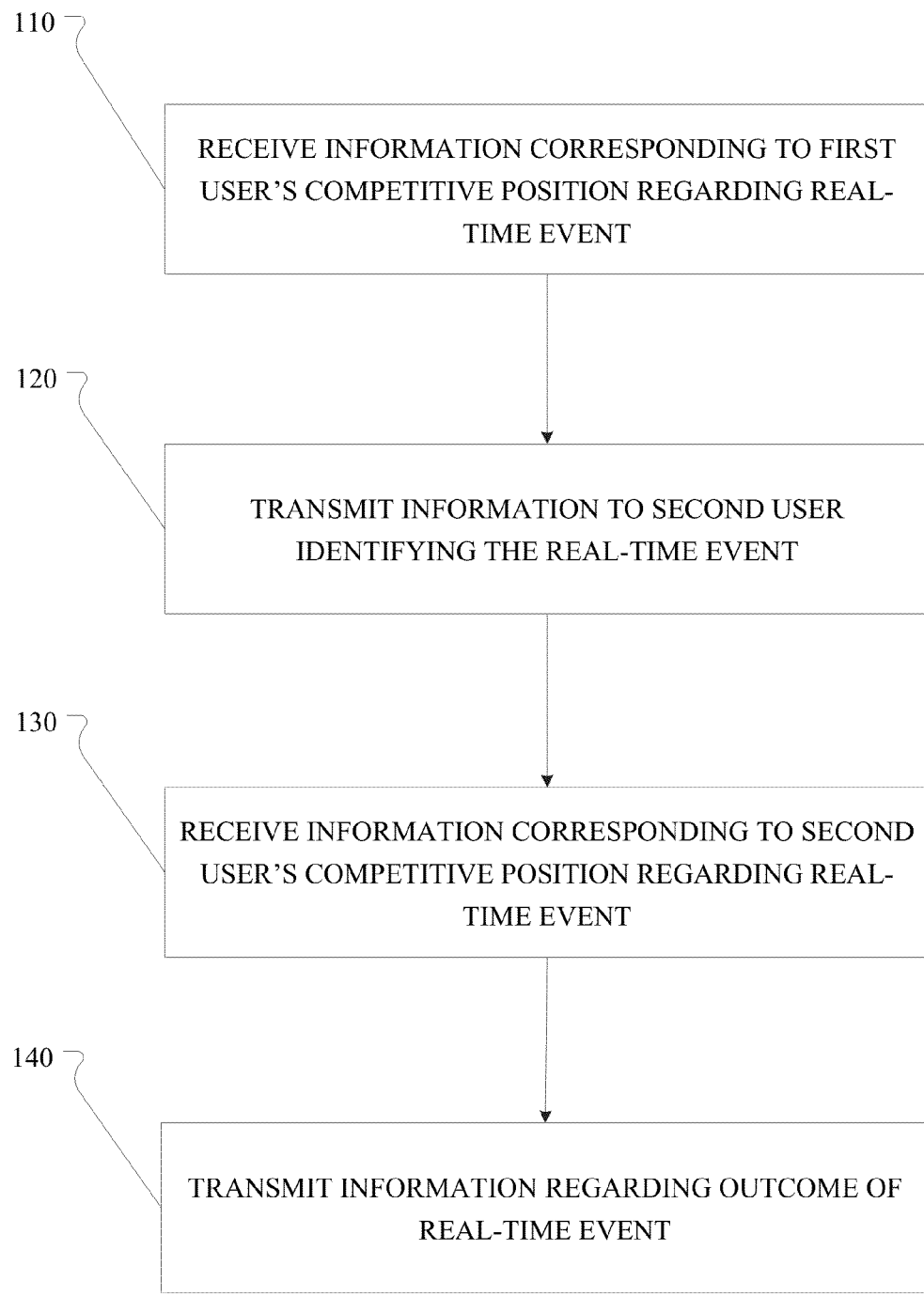
FIG. 1 illustrates an exemplary method enabling real-time competition between users according to the disclosed embodiment.

More specifically, as shown in FIG. 1, an exemplary method of the disclosed embodiment enables real-time competition between users. This method may be executed by a server or other centralized computing device, a user computing device operating in a server mode, and the like. In step 110, information is received from a first user computing device associated with a first user corresponding to the first user's competitive position regarding a real-time event. For example, the first user may select a certain team to win a sporting event, a specific currency or commodity, or any other selection associated with a real-time event. In step 120, information is transmitted to a second user computing device associated with a second user identifying the real-time event. This information informs the second user of the first user's desire to initiate a real-time competition, and identified the real-time event, such as commodity valuation, a sporting event, etc. In step 130, information is received from the second user computing device corresponding to the second user's competitive position regarding the real-time event, such as a selection of a different commodity, etc. In step 140, information is transmitted to the first user computing device and the second user computing device regarding an outcome of the real-time event relative to the first user's competitive position and the second user's competitive position.

Figure 2:
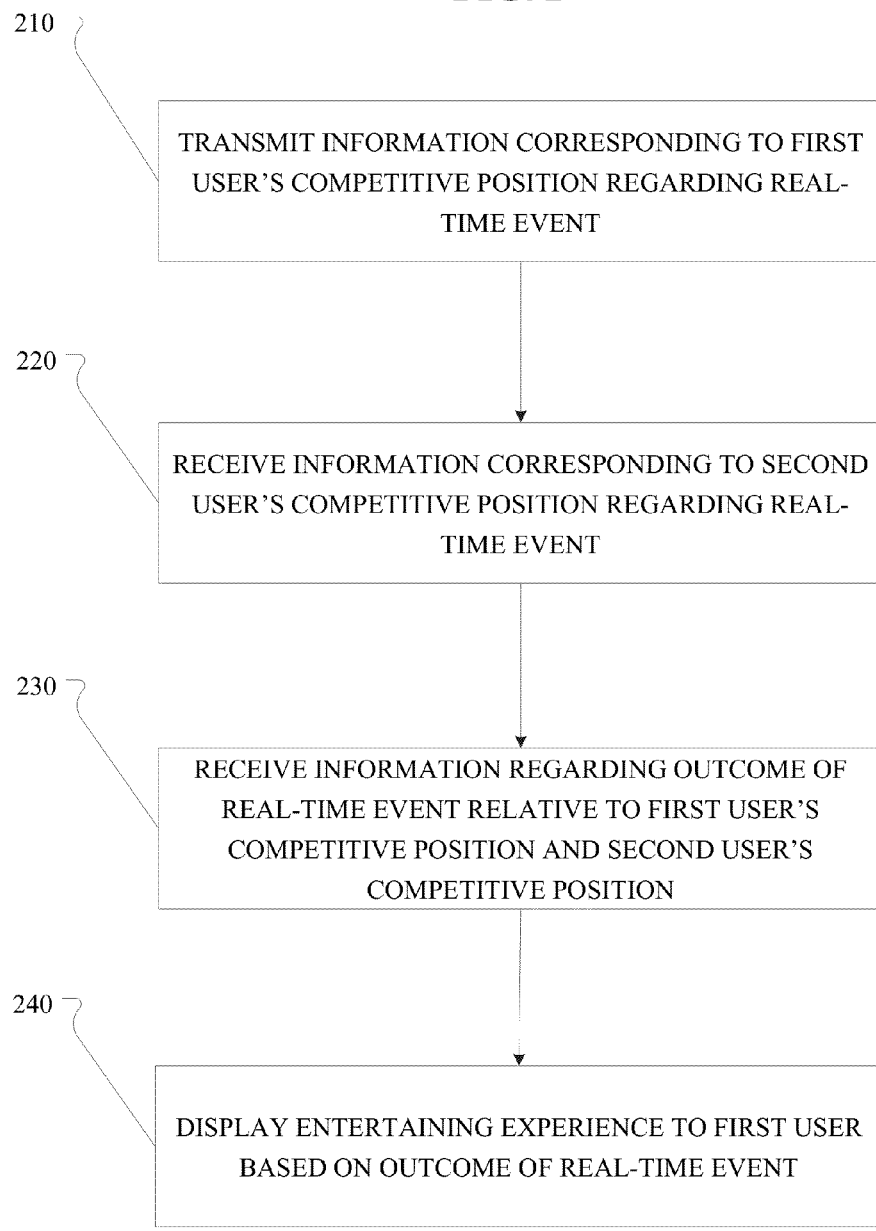
FIG. 2 illustrates an exemplary method enabling real-time competition between users according to the disclosed embodiment.

FIG. 2 illustrates an exemplary method of the disclosed embodiment that also enables real-time competition between users. This method may be executed by a user device, a server or other centralized computing device operating in a client mode, and the like. In step 210, information is transmitted corresponding to a first user's competitive position regarding a real-time event. In step 220, information is received corresponding to a second user's competitive position regarding the real-time event. In step 230, information is received regarding an outcome of the real-time event relative to the first user's competitive position and the second user's competitive position. In step 240, an entertaining experience is displayed to the first user based on the outcome of the real-time event relative to the first user's competitive position and the second user's competitive position.

For example, if a competition between users is based around the results of an election, for example, the U.S. Presidential election, each user may select, as their competitive position, which may or may not include additional criteria, which candidate they think may win, which states each party will win, what percentage of the votes each candidate will receive, and the like. The platform of the disclosed embodiment may present the results of the election as an entertaining experience in real-time on computing devices associated with each user as cars moving around a racetrack based on each users predictions regarding the election results. In this example, the experience may begin when election ballots close and will continue until all votes have been tallied or the election has been decided.

As another example, if a competition between users is about which country will earn more medals in the Olympic games, each user may select, as their competitive position, which may or may not include additional criteria, which country will win more gold medals, more total medals, and the like. Suppose the real-time event is based on the number of total medals, and one user selects the United States and another user selects China, the platform of the disclosed embodiment may present the results in a real-time entertaining experience on computing devices associated with each user as a soccer game in which one team scores a goal every time the United States earns a medal and the other team scores a goal every time China earns a medal. The winner of the competition will be the user associated with whichever country earns more medals. In this example, the experience may begin with the first event in the Olympic games and may continue until the end of the final event of the Olympic games. In another example, the competition may be limited to a specific sporting event, such as swimming, in which case the experience may begin with the first swimming event and end with the final swimming event.

In addition to sporting events, elections, and other real-time events, the disclosed embodiment allows for real-time competitions in other competitive areas such as commodities. Commodities, as used herein, includes, for example, all types of global currencies, hard commodities such as precious metals and/or other metals (i.e. silver, gold, nickel, platinum, iron, steel, aluminum, copper, palladium, etc.), soft commodities such as agricultural products (i.e. cotton, wheat, corn, sugar, salt, rice, soybeans, coffee, rubber, livestock, etc.), energy commodities (i.e. electricity, crude and/or Brent oil, natural gas, coal, etc.), precious/semi precious gemstones, and the like. Essentially, anything that can change in value or be traded can be categorized as a commodity herein.

Commodities as used herein can also include events such as natural events (i.e. weather prediction, periodic rainfall or lack thereof, storm prediction, earthquakes, hurricanes, tornados, floods, tsunamis, etc.) and financial fluctuations (i.e. stocks and/or shares in any stock market or regional economy (i.e. global stock markets, future markets, AIM Listed companies, etc.), real estate and/or property values, country or regional tax rates, interest rates, gross domestic product or any country, etc.). For each competitive area, criteria can include, as appropriate, commodities rising in value, falling in value, or holding a current value. In addition, criteria can relate to odds associated with one or more competitive positions.

As described above, a competition between users may be based on the economic or industrial performance of a country or region relative to another country or region. In this regard, one aspect of the disclosed embodiment relates to the value of international currencies or commodities, with the competition being based on the value of the currency of one country or region relative to the value of the currency of another country or region. Specifically, one aspect of the disclosed embodiment relates to how the value of a specific currency or commodity fluctuates relative to the value of another currency or commodity. As an example, one user may be represented by the U.S. Dollar and another user may be represented by the U.K. pound, and the competition may be based on the fluctuation of the two currencies in the global economy and which currency performs better over a period of time. For example, the platform of the disclosed embodiment may present the results in real-time on computing devices associated with each user as a football game between the two users, wherein each team advances when their respective currencies increase in value relative to the other currency, and vice versa. The experience may last for any period of time, for example, a day of financial trading, with the competition being decided when the financial market in a specific country or region closes for the day.

In the scenario in which the competitions of the disclosed embodiment are broadcast or displayed to one or more users on televisions or the like, more than one user may view the broadcast. This is especially useful in an environment in which more than one user is watching the same broadcast of a competition, or when users in different locations are watching the same broadcast. When this occurs, the broadcast preferably includes the entire competition, either in a combined display, or in a split-screen or frame structure wherein the competition is displayed from the perspectives of each user. For example, if the competition is broadcast in a restaurant, bar, casino, etc., a single television may display the competition for a plurality of users, and each user would preferably be able to determine, from the broadcast, their current standing in the competition. In addition, using this configuration makes it easy for existing users to leave the competition or new users to join the competition, for example, between rounds of play.

Another aspect of the disclosed embodiment enables users to place wagers based on the real-time events, with the winner of the competition being rewarded with winnings based on the wagers. In addition, one or more users may select criteria associated with odds associated with their wager, thereby increasing or decreasing the stakes associated with their wager. For example, using the U.S. Presidential election example above, wagers may be based on the performance of certain candidates in certain states, margin of victory, overall winner, and the like. Similarly, using the Olympic games example above, wagers may be based on total number of medals, number of gold, silver, or bronze medals, percentage of overall medals, and the like. Moreover, using the economic or industrial performance example above, wagers may be based on the rate of growth of a particular commodity relative to another, overall growth over a period of time, and the like. Generally speaking, the competitions described herein may be based on any type of live event, including, for example, sporting events (football games, boxing matches, soccer matches, basketball tournaments, etc.), and the like.

Of course, there are many variations of the real-time competitions of the disclosed embodiment, and the rules associated with the competitions can easily be modified to provide a wide range of competitions. This will allow the competitions to appeal to a wide range of players. Two examples include Turn Play (i.e. Each round can be as short as 2 minutes or as long as a week. This allows casual competition between long distance friends who play one round each day during lunch to hard core players who play 2 minute round speed competitions.) and Tournaments (i.e. Special events can created with playoff style tournaments. Players enter the field and compete to be the ultimate champion.).

The methods of the disclosed embodiment also enable a competition host, such as a centralized server or the like, to retain a percentage of the wagers as a fee for hosting and/or participating in the competition. Cheating can also be prevented by requiring advance payment of each wager, for example.

The disclosed embodiment further relates to collecting player data and play patterns for future use, such as targeted advertisements and other platform offerings, and to improve the platform experience to increase customer satisfaction.

Figure 3:
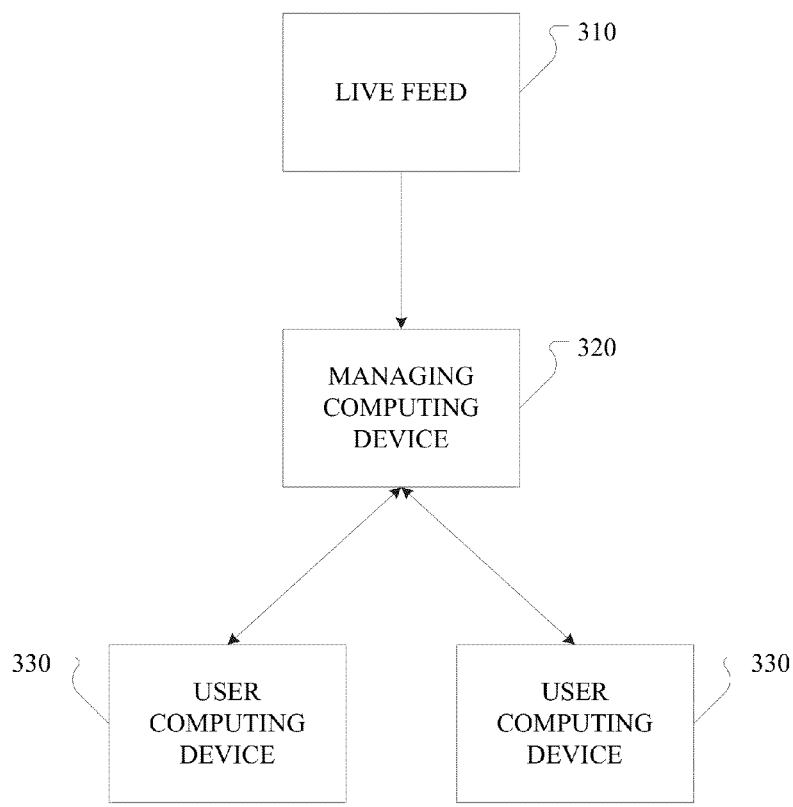
FIG. 3 illustrates an exemplary arrangement according to the disclosed embodiment in which competitions are managed by one or more managing computing devices.

As described herein, and shown in FIG. 3, the competitions may be managed by one or more managing computing devices 320, such as a server and the like, with data being transmitted back and forth between user computing devices 330 and managing computing devices 320, as needed, to enable the real-time competitions of the disclosed embodiment. In this configuration, a live feed 310 preferably provides information associated with the real-time event to managing computing devices 320, which in turn, transmits the information, as appropriate, to the user computing devices 330.

Figure 4:
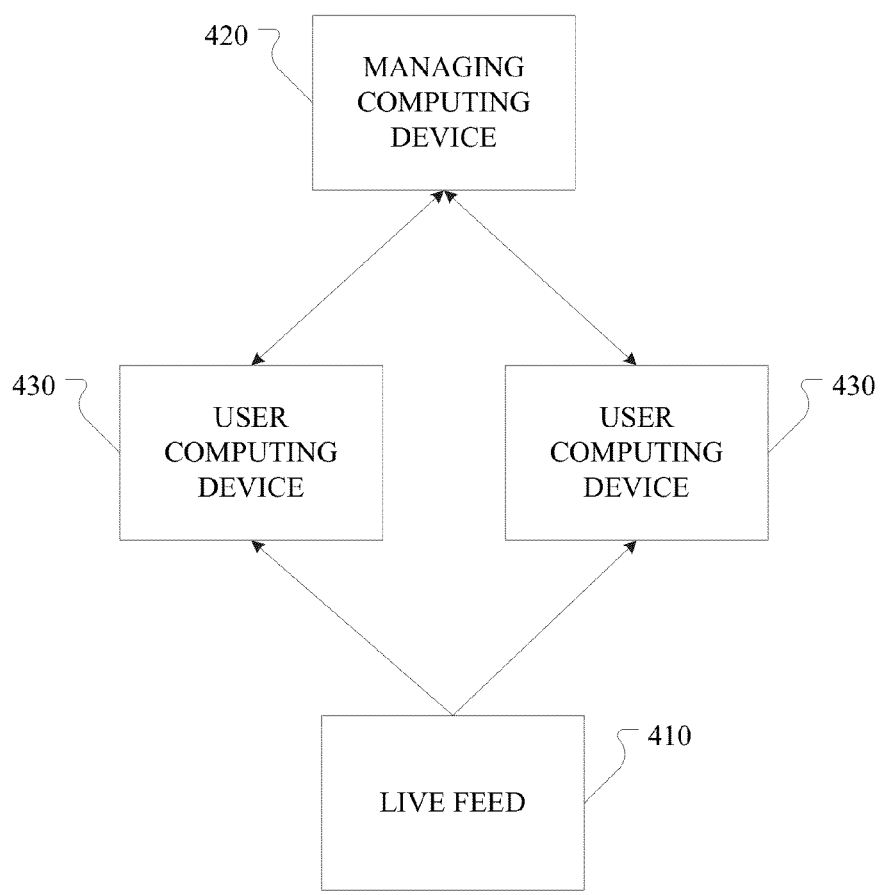
FIG. 4 illustrates an exemplary arrangement according to the disclosed embodiment in which competitions are managed by one or more managing computing devices.

In an alternative configuration shown in FIG. 4, the competitions may be managed by one or more managing computing devices 420, such as a server and the like, with data being transmitted back and forth between user computing devices 430 and managing computing devices 420, as needed, to enable the real-time competitions of the disclosed embodiment. In this configuration, a live feed 410 preferably provides information associated with the real-time event directly to one or more of user computing devices 430, which can, if appropriate, transmit the information to managing computing devices 420.

Figure 5:
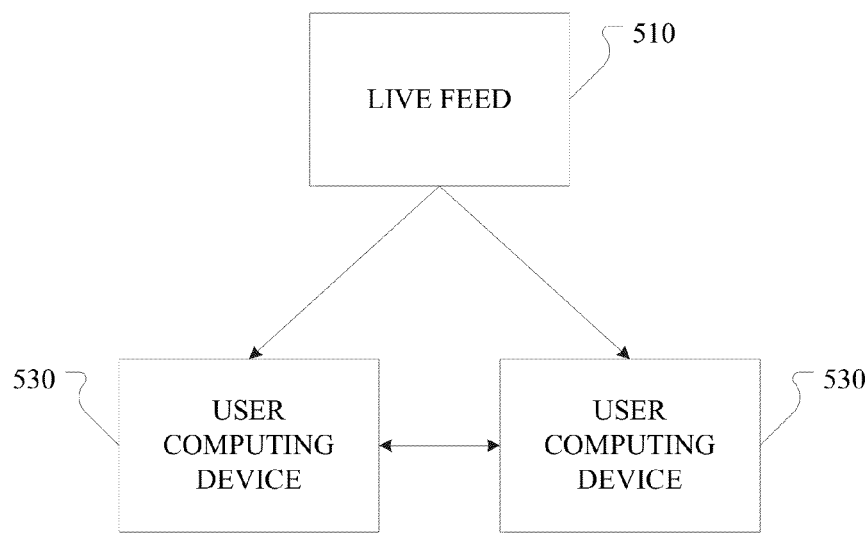
FIG. 5 illustrates an exemplary arrangement according to the disclosed embodiment in which competitions are managed by one or more user computing devices without a managing computing device.

In another alternative configuration shown in FIG. 5, the competitions may be managed by one or more of user computing devices 530 without a managing computing device being required. In this scenario, data can be transmitted back and forth between user computing devices 530, as needed, to enable the real-time competitions of the disclosed embodiment. In this configuration, a live feed 510 preferably provides information associated with the real-time event directly to one or more of user computing devices 530.

The following examples illustrate exemplary applications of the methods of the disclosed embodiments.

EXAMPLE 1

Sports Commodity Gambling—Soccer

Figure 6A:
FIGS. 6A-6B illustrate exemplary entertaining experiences displayed as a fast paced penalty shootout themed soccer game according to the disclosed embodiment.
Figure 6B:

As described in this example and shown in FIGS. 6A and 6B, an aspect of the disclosed embodiment relates to a fast paced penalty shootout themed soccer game designed for two players. This competition is preferably played in a series of rounds, and at the start of each round, players place bets on a commodity of their choosing. If a player's bet is successful, that player's team will score a goal. If a player's bet is not successful, that player's team will miss the shot. The competition may be played in a best-of format, for example, best of five. If there is a tie, the competition can go to sudden death.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

£ VERSUS $
£10 per bet
2:00 minute rounds

When the competition begins, both players will choose which commodity will gain more at the start of each round, and they may have until the round time limit to change their selection. The selection of the commodity by each player may either be secret until the competition begins, or may be displayed to all players. For example:

Player 1 wagers that the pound will gain on the dollar
Player 2 wagers that the dollar will gain on the pound If a player guesses correctly, he sees his team score a goal. If a player guesses incorrectly, he sees his team miss the kick. For example, if the pound gained on the dollar during the round, Player 1 would score a goal, and Player 2 would miss.

Gameplay continues in this fashion until the end of the competition, for example, until one player scores five goals. For example, Player 1 may score five goals in a row and win the competition.

Of course, there are many variations of this type of competition, and the competition rules can easily be modified to provide a wide range of playing. This will allow the competition to appeal to a wide range of players. Two examples include Turn Play (i.e. Each round can be as short as 2 minutes or as long as a week. This allows casual betting between long distance friends who play one round each day during lunch to hard core players who play 2 minute round speed competitions.) and Tournaments (i.e. Special events can created with playoff style tournaments. Players are paired off and compete to be the ultimate champion.). At the conclusion of the competition, the winning player may be rewarded with a payout based on the wagers he placed and/or the rules of the competition.

EXAMPLE 2

Sports Commodity Gambling—Football

Figure 7A:
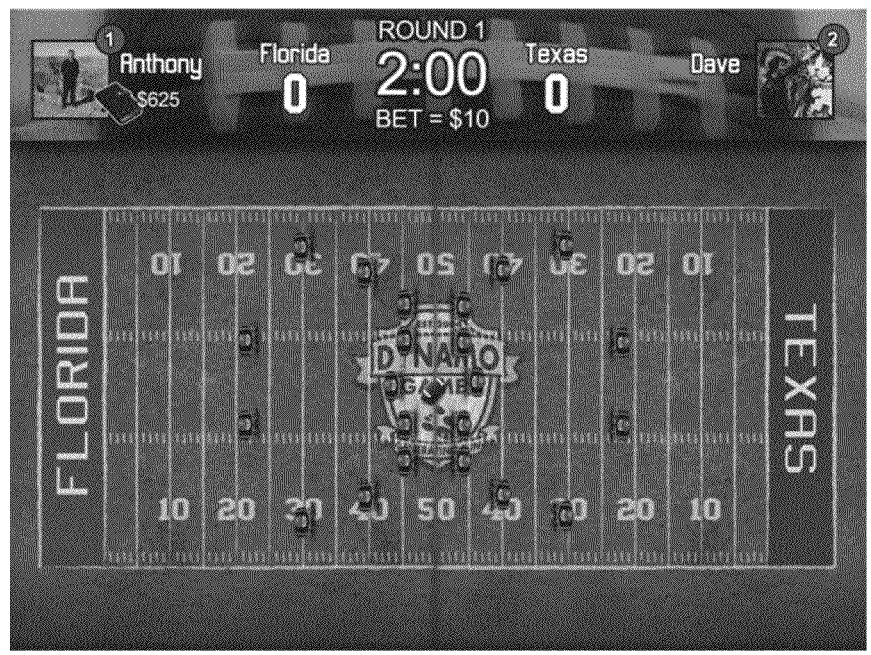
FIGS. 7A-7C illustrate exemplary entertaining experiences displayed as a football game according to the disclosed embodiment.
Figure 7B:
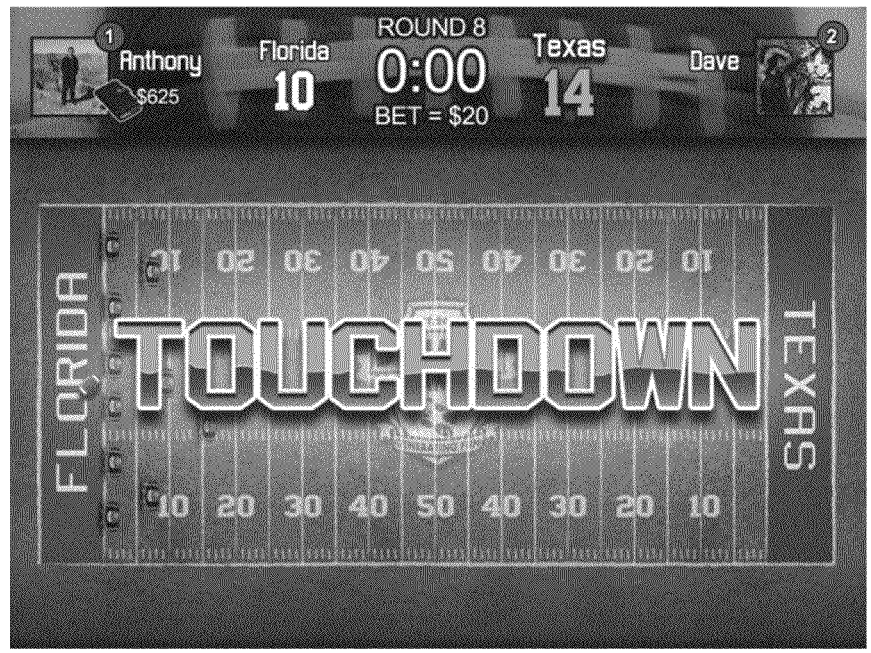
Figure 7C:
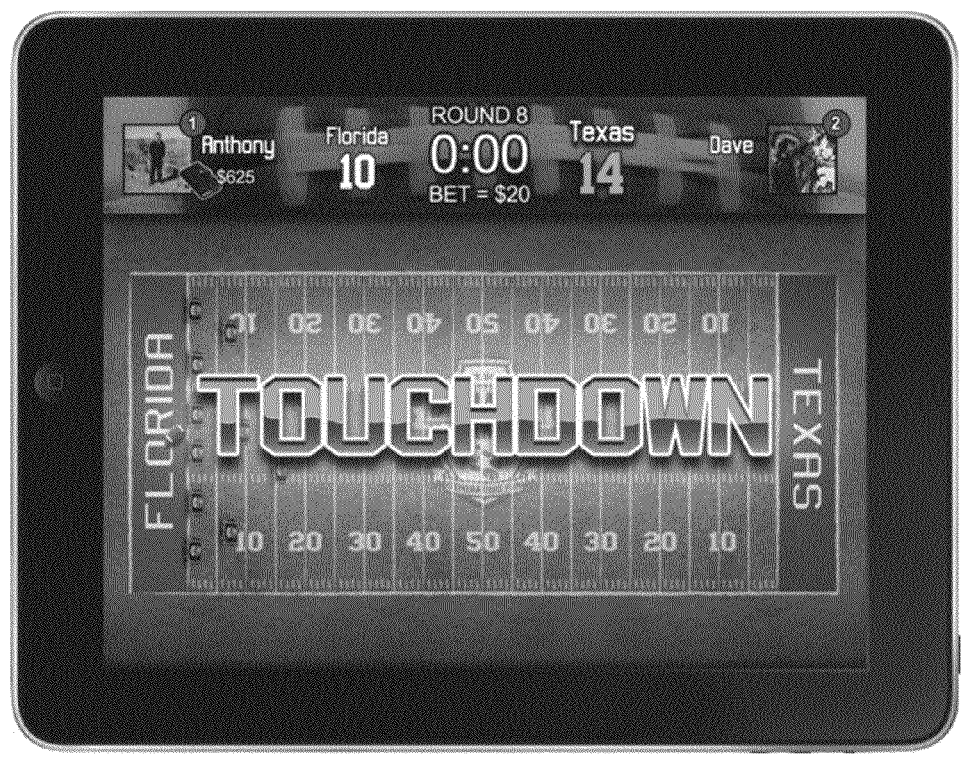

As described in this example and shown in FIGS. 7A, 7B, and 7C, an aspect of the disclosed embodiment relates to a slower paced, wager based simulation of American football designed for two players. Competition begins with the ball placed on the 50 yard line, and the competition is preferably played in a series of rounds. At the start of each round, both players place bets on their chosen commodity. A successful bet results in the ball moving towards the opposing end zone. A failure results a loss yards. A tie results in no change. The first player to move the ball into the opposing end zone scores, and the player with the highest score after the set number of rounds wins. In the event of a tie, the competition goes to sudden death.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

$ VERSUS £
$10 per bet
2:00 minute rounds

When the competition begins, both players will choose which commodity will gain more at the star of each round, and they may have until the round time limit to change their selection. The selection of the commodity by each player may either be secret until the competition begins, or may be displayed to all players. For example:

Player 1 wagers that the dollar will gain on the pound
Player 2 wagers that the pound will gain on the dollar If a player guesses correctly and his opponent guesses incorrectly, the team associated with the correct player moves the ball forward 10 yards. If both players guess correctly or incorrectly, the ball does not move. The ball can go back and forth until one team pushes the ball into the opposing end zone, scoring a touchdown. For example, if the dollar gained on the pound, Player 1's team would move the ball forward 10 yards, and Player 2's team would surrender 10 yards to his opponent.

Gameplay continues in this fashion until the end of the competition, for example, until the round limit or score limit has been reached. For example, after 20 rounds of play, Player 1 wins the competition by a score of 14 to 12.

Of course, there are many variations of this type of competition, and the competition rules can easily be modified to provide a wide range of playing. Two example include Turn Play (i.e. Each round can be as short as 2 minutes or as long as a week. This allows casual betting between long distance friends who play one round each day during lunch to hard core players who play 2 minute round speed competitions.) and Tournaments (Special events can created with playoff style tournaments. Players are paired off and compete to be the ultimate champion.). At the conclusion of the competition, the winning player may be rewarded with a payout based on the wagers he placed and/or the rules of the competition.

EXAMPLE 3

Sports Commodity Gambling—Racing

Figure 8A:
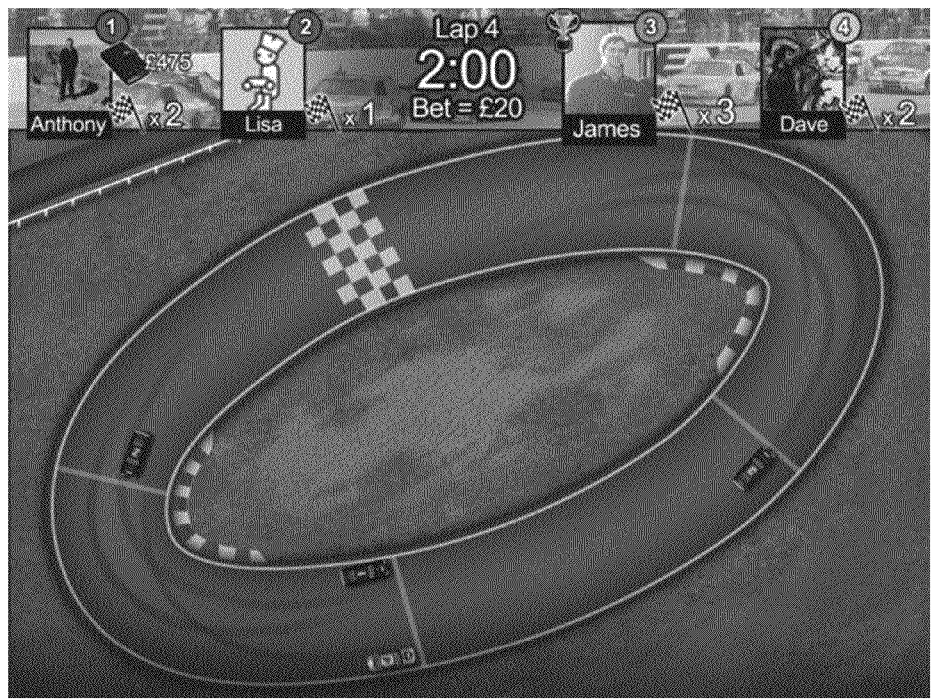
FIGS. 8A-8B illustrate exemplary entertaining experiences displayed as a racetrack according to the disclosed embodiment.
Figure 8B:
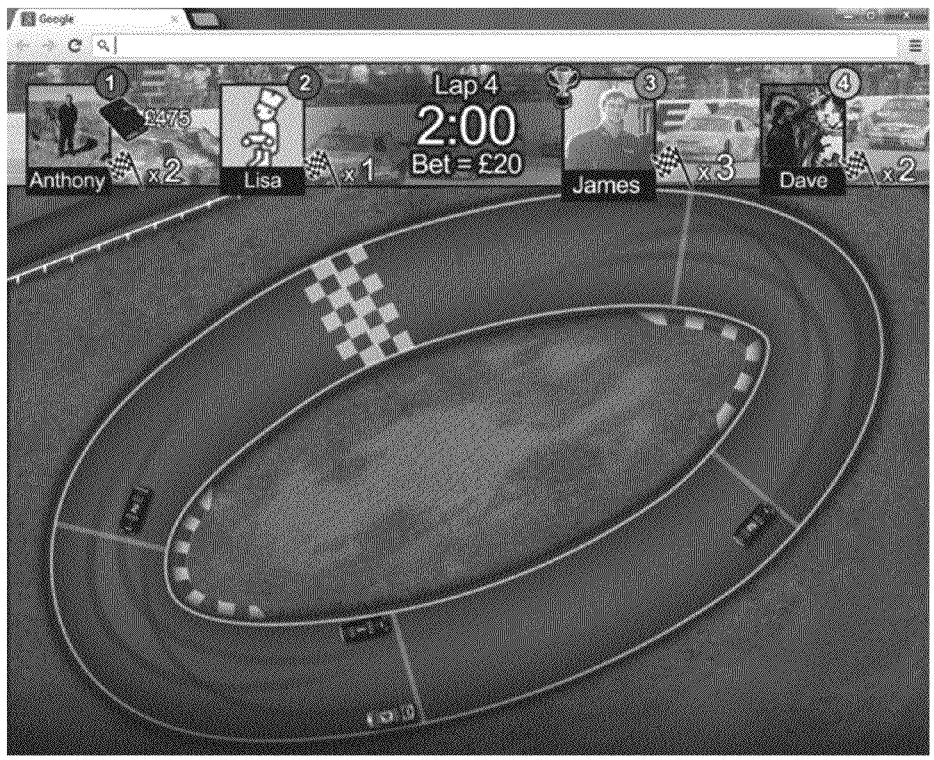

As described in this example and shown in FIGS. 8A and 8B, an aspect of the disclosed embodiment relates to a fun party based racing competition for up to four players. This competition is preferably played with all players beginning on the starting line. The competition is played in a series of rounds, and at the start of each round, all players place bets on their chosen commodity. A successful bet results in a their car accelerating to the next position on the track, and a failure results in their car staying in place. The first player to complete the specified number of laps wins. In the event of a tie, the competition goes to sudden death between the potential winners.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

£ VERSUS $
£20 per bet
2:00 minute rounds

When the competition begins, both players will choose which commodity will gain more at the start of each round, and they may have until the round time limit to change their selection. The selection of the commodity by each player may either be secret until the competition begins, or may be displayed to all players. For example:

Player 1 wagers that the pound will gain on the dollar
Player 2 wagers that the dollar will gain on the pound
Player 3 wagers that the dollar will gain on the pound
Player 4 wagers that the dollar will gain on the pound If a player guesses correctly, he sees his car advance to the next track position. If a player guesses incorrectly, he sees his car stay in place. For example, if the pound gained on the dollar, Player 1's car advanced one spot, Player 2's car stayed in place, Player 3's car stayed in place, and Player 4's car stayed in place.

Gameplay continues in this fashion until the end of the competition, for example, until one player completed the specified number of laps. For example, Player 1 completes three laps before the other players and wins the competition.

COMPUTING ENVIRONMENT

The disclosed embodiments may be implemented on any suitable platform, including, for example, web-based applications, mobile applications, software, and the like, and may be accessed by users using any suitable computing device including, for example, computers, tablets, smart phones, mobile phone, PDA's, or any other suitable computing device. Exemplary computing devices include, for example, Apple-based computing devices (i.e. iMacs, iPhones, iPads, etc.), Android-based computing devices, Windows-based computing systems, and the like. The competitions of the disclosed embodiment may also be broadcast or displayed to one or more users on televisions or the like, for example, on a dedicated channel.

The methods of the disclosed embodiment are preferably computer-implemented and executed by one or more computing devices. In addition, the disclosed embodiment relates to apparatus comprising one or more processors and one or more memories operatively coupled to at least one of the one or more processors. The memories of an exemplary apparatus have instructions stored thereon that, when executed by at least one of the one or more processors, cause at least one of the one or more processors to carry out the steps of the exemplary methods. The disclosed embodiment further relates to non-transitory computer-readable media storing computer-readable instructions that, when executed by at least one of one or more computing devices, cause at least one of the one or more computing devices to carry out the steps of the exemplary methods.

Figure 9:
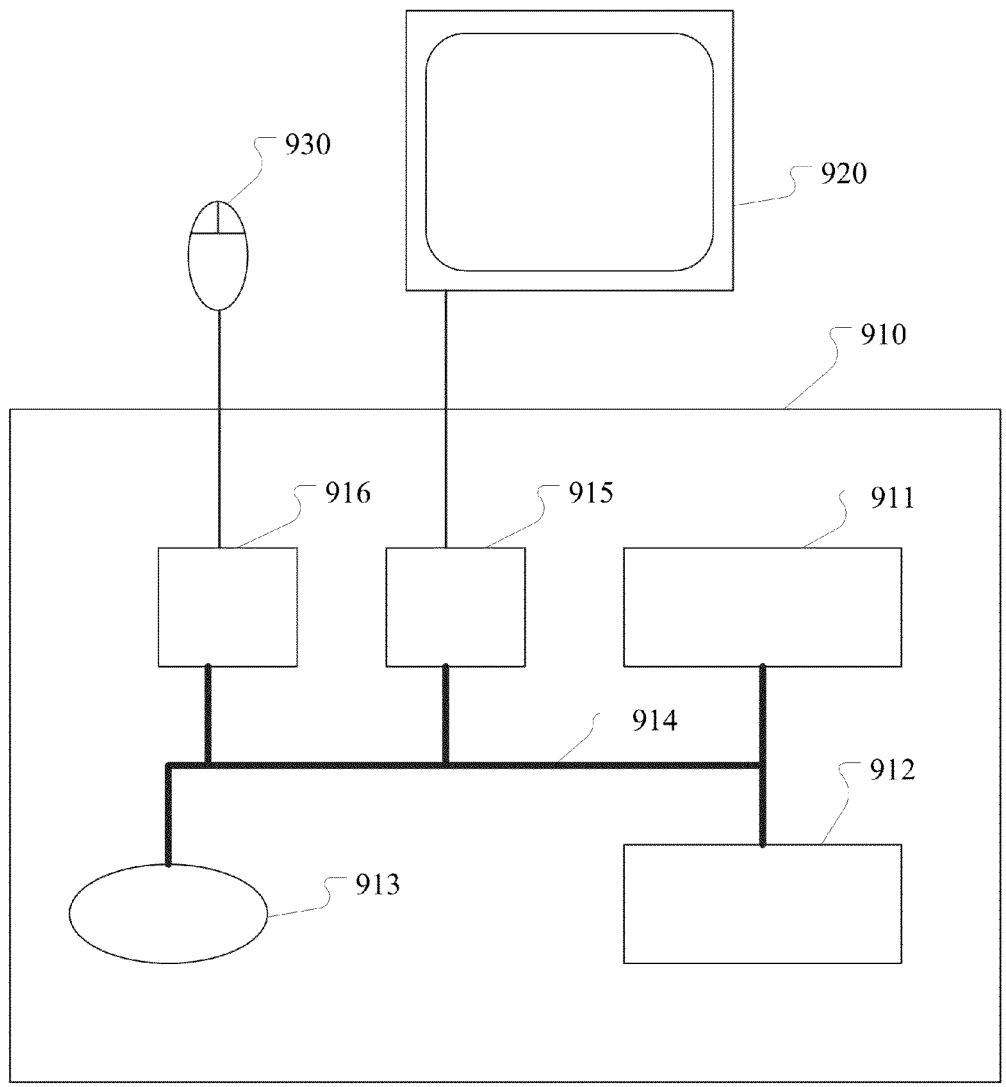
FIG. 9 illustrates an exemplary computing environment according to the disclosed embodiment.

The embodiments described herein may be implemented with any suitable hardware and/or software configuration, including, for example, modules executed on computing devices such as computing device 910 of FIG. 9. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 910 has one or more processing device 911 designed to process instructions, for example computer readable instructions (i.e., code) stored on a storage device 913. By processing instructions, processing device 911 may perform the steps set forth in the methods described herein.

Storage device 913 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 910 additionally has memory 912, an input controller 916, and an output controller 915. A bus 914 operatively couples components of computing device 910, including processor 911, memory 912, storage device 913, input controller 916, output controller 915, and any other devices (e.g., network controllers, sound controllers, etc.). Output controller 915 may be operatively coupled (e.g., via a wired or wireless connection) to a display device 920 (e.g., a monitor, television, mobile device screen, touch-display, etc.) In such a fashion that output controller 915 can transform the display on display device 920 (e.g., in response to modules executed). Input controller 916 may be operatively coupled (e.g., via a wired or wireless connection) to input device 930 (e.g., mouse, keyboard, touch-pad, scroll-ball, touch-display, etc.) In such a fashion that input can be received from a user (e.g., a user may input with an input device 930 a dig ticket).

Of course, FIG. 9 illustrates computing device 910, display device 920, and input device 930 as separate devices for ease of identification only. Computing device 910, display device 920, and input device 930 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 910 may be one or more servers, for example a farm of networked servers, a clustered server environment, or a cloud network of computing devices.

While systems and methods are described herein by way of example and embodiments, those skilled in the art recognize that the disclosed embodiment is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A computer-implemented method executed by one or more computing devices for enabling real-time competition between a first user and a second user, the method comprising:

receiving, by at least one of the one or more computing devices, information corresponding to a first competitive position associated with the first user, the first competitive position being associated with a live event that occurs over a specified duration of time;

receiving, by at least one of the one or more computing devices, information corresponding to a second competitive position associated with the second user, the second competitive position also being associated with the live event, the first competitive position and the second competitive position being mutually exclusive;

transmitting, by at least one of the one or more computing devices, information to at least one of a first user computing device associated with the first user and a second user computing device associated with the second user for display as an entertaining experience during the specified duration of time, the entertaining experience including a graphical representation of a sporting event having a subject matter that is disparate from a subject matter of the live event, the entertaining experience indicating a real-time state of the first competitive position relative to the second competitive position, the real-time state corresponding to a first state in which the first competitive position is consistent with real-time data associated the live event, a second state in which the second competitive position is consistent with the real-time data associated with the live event, or a third state in which neither the first competitive position nor the second competitive position is consistent with the real-time data associated the live event; and transmitting, by at least one of the one or more computing devices, after the specified duration of time has ended, outcome information to at least one of the first user computing device and the second user computing device, the outcome information indicating whether the real-time data at the end of the specified duration of time was consistent with the first competitive position or the second competitive position.

2. The method of claim 1, wherein the real-time state is obtained from a live feed.

3. The method of claim 1, wherein the specified duration of time is a fixed time interval having a start time and an end time.

4. The method of claim 1, wherein the information corresponding to the first competitive position includes a selection of one or more criteria associated with the first competitive position.

5. The method of claim 4, wherein the information from the first user computing device corresponding to the first competitive position includes a wager associated with the first competitive position.

6. The method of claim 1, wherein the information corresponding to the first competitive position includes odds associated with the first competitive position.

7. An apparatus for enabling real-time competition between a first user and a second user, the apparatus comprising:
one or more processors; and
one or more memories operatively coupled to at least one of the one or more processors and having instructions stored thereon that, when executed by at least one of the one or more processors, cause at least one of the one or more processors to:
enable the receipt of information corresponding to a first competitive position associated with the first user, the first competitive position being associated with a live event that occurs over a specified duration of time;
enable the receipt of information corresponding to a second competitive position associated with the second user, the second competitive position also being associated with the live event, the first competitive position and the second competitive position being mutually exclusive;
transmit information to at least one of a first user computing device associated with the first user and a second user computing device associated with the second user for display as an entertaining experience during the specified duration of time, the entertaining experience including a graphical representation of a sporting event having a subject matter that is disparate from a subject matter of the live event, the entertaining experience indicating a real-time state of the first competitive position relative to the second competitive position, the real-time state corresponding to a first state in which the first competitive position is consistent with real-time data associated the live event, a second state in which the second competitive position is consistent with the real-time data associated with the live event, or a third state in which neither the first competitive position nor the second competitive position is consistent with the real-time data associated the live event; and
transmit, after the specified duration of time has ended, outcome information to at least one of the first user computing device and the second user computing device, the outcome information indicating whether the real-time data at the end of the specified duration of time was consistent with the first competitive position or the second competitive position.

8. The apparatus of claim 7, wherein the real-time state is obtained from a live feed.

9. The apparatus of claim 7, wherein the specified duration of time is a fixed time interval having a start time and an end time.

10. The apparatus of claim 7, wherein the information corresponding to the first competitive position includes a selection of one or more criteria associated with the first competitive position.

11. The apparatus of claim 10, wherein the information from the first user computing device corresponding to the first competitive position includes a wager associated with the first competitive position.

12. The apparatus of claim 7, wherein the information corresponding to the first competitive position includes odds associated with the first competitive position.

13. At least one non-transitory computer-readable medium storing computer-readable instructions that, when executed by one or more computing devices, cause at least one of the one or more computing devices to:
receive information corresponding to a first competitive position associated with the first user, the first competitive position being associated with a live event that occurs over a specified duration of time;
receive information corresponding to a second competitive position associated with the second user, the second competitive position also being associated with the live event, the first competitive position and the second competitive position being mutually exclusive;
transmit information to at least one of a first user computing device associated with the first user and a second user computing device associated with the second user for display as an entertaining experience during the specified duration of time, the entertaining experience including a graphical representation of a sporting event having a subject matter that is disparate from a subject matter of the live event, the entertaining experience indicating a real-time state of the first competitive position relative to the second competitive position, the real-time state corresponding to a first state in which the first competitive position is consistent with real-time data associated the live event, a second state in which the second competitive position is consistent with the real-time data associated with the live event, or a third state in which neither the first competitive position nor the second competitive position is consistent with the real-time data associated the live event; and transmit, after the specified duration of time has ended, outcome information to at least one of the first user computing device and the second user computing device, the outcome information indicating whether the real-time data at the end of the specified duration of time was consistent with the first competitive position or the second competitive position.

14. The at least one non-transitory computer-readable medium of claim 13, wherein the real-time state is obtained from a live feed.

15. The at least one non-transitory computer-readable medium of claim 13, wherein the specified duration of time is a fixed time interval having a start time and an end time.

16. The at least one non-transitory computer-readable medium of claim 13, wherein the information corresponding to the first competitive position includes a selection of one or more criteria associated with the first competitive position.

17. The at least one non-transitory computer-readable medium of claim 16, wherein the information from the first user computing device corresponding to the first competitive position includes a wager associated with the first competitive position.

18. The at least one non-transitory computer-readable medium of claim 13, wherein the information corresponding to the first competitive position includes odds associated with the first competitive position.

19. At least one non-transitory computer-readable medium storing computer-readable instructions that, when executed by one or more computing devices, cause at least one of the one or more computing devices to:

transmit information corresponding to a first competitive position associated with the first user, the first competitive position being associated with a live event that occurs over a specified duration of time;

receive information corresponding to a second competitive position associated with the second user, the second competitive position also being associated with the live event, the first competitive position and the second competitive position being mutually exclusive;

display an entertaining experience during the specified duration of time, the entertaining experience including a graphical representation of a sporting event having a subject matter that is disparate from a subject matter of the live event, the entertaining experience indicating a real-time state of the first competitive position relative to the second competitive position, the real-time state corresponding to a first state in which the first competitive position is consistent with real-time data associated the live event, a second state in which the second competitive position is consistent with the real-time data associated with the live event, or a third state in which neither the first competitive position nor the second competitive position is consistent with the real-time data associated the live event; and after the specified duration of time has ended, receive outcome information indicating whether the real-time data at the end of the specified duration of time was consistent with the first competitive position or the second competitive position.

20. The at least one non-transitory computer-readable medium of claim 19, wherein the real-time state is obtained from a live feed.

21. The at least one non-transitory computer-readable medium of claim 19, wherein the specified duration of time is a fixed time interval having a start time and an end time.

22. The at least one non-transitory computer-readable medium of claim 19, wherein the information corresponding to the first competitive position includes a selection of one or more criteria associated with the first competitive position.

23. The at least one non-transitory computer-readable medium of claim 22, wherein the information from the first user computing device corresponding to the first competitive position includes a wager associated with the first competitive position.

24. The at least one non-transitory computer-readable medium of claim 19, wherein the information corresponding to the first competitive position includes odds associated with the first competitive position.

\* \* \* \* \*